(12) United States Patent
Diehl

(10) Patent No.: US 6,907,488 B1
(45) Date of Patent: Jun. 14, 2005

(54) SERIAL DATA TRANSMISSION VIA A BUS SYSTEM

(75) Inventor: Michael Diehl, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 10/070,991

(22) PCT Filed: Sep. 7, 2000

(86) PCT No.: PCT/DE00/03109

§ 371 (c)(1),
(2), (4) Date: Mar. 14, 2002

(87) PCT Pub. No.: WO01/20416

PCT Pub. Date: Mar. 22, 2001

(30) Foreign Application Priority Data

Sep. 14, 1999 (DE) .......................................... 199 44 041

(51) Int. Cl.$^7$ ..................... G06F 13/14; G06F 13/00; G05B 19/18; G05B 11/01
(52) U.S. Cl. ..................... 710/305; 710/110; 710/242; 700/3; 700/8
(58) Field of Search ..................... 710/53, 56, 71, 710/310; 709/201, 208; 700/2, 282; 711/167, 200, 2; 713/100; 340/3.51; 341/101; 358/442; 370/252, 235, 2; 375/225; 398/136

(56) References Cited

U.S. PATENT DOCUMENTS

| | | | | |
|---|---|---|---|---|
| 4,728,930 A | * | 3/1988 | Grote et al. ................. | 341/101 |
| 4,745,540 A | | 5/1988 | Hamada et al. | |
| 5,007,051 A | * | 4/1991 | Dolkas et al. .............. | 370/235 |
| 5,046,039 A | * | 9/1991 | Ugajin et al. ................. | 710/56 |
| 5,132,680 A | * | 7/1992 | Tezuka et al. ............. | 340/3.51 |
| 5,278,956 A | * | 1/1994 | Thomsen et al. ........... | 711/167 |
| 5,430,847 A | * | 7/1995 | Bradley et al. ............. | 710/310 |
| 5,557,751 A | * | 9/1996 | Banman et al. ............. | 398/136 |
| 5,596,724 A | * | 1/1997 | Mullins et al. ............... | 710/71 |
| 5,663,948 A | * | 9/1997 | Kobunaya .................... | 370/229 |
| 5,832,308 A | * | 11/1998 | Nakamura et al. ............ | 710/53 |
| 5,872,845 A | * | 2/1999 | Feder ......................... | 358/442 |
| 6,041,397 A | * | 3/2000 | Rickard et al. ............. | 711/209 |

(Continued)

FOREIGN PATENT DOCUMENTS

| | | |
|---|---|---|
| DE | 195 29 718 A1 | 2/1997 |
| DE | 196 29 868 A1 | 2/1998 |
| DE | 197 34 694 A1 | 3/1999 |
| EP | 0 503 323 A2 * 9/1992 | ........... H04L/12/40 |
| JP | 408044661 A * 2/1996 | ......... G06F/13/362 |
| WO | WO 98/35275 | 8/1998 |

*Primary Examiner*—Glenn A. Auve
*Assistant Examiner*—Christopher E. Lee
(74) *Attorney, Agent, or Firm*—Morrison & Foerster LLP

(57) ABSTRACT

The present invention relates to a passive component for a bus system, such as, for example, a field bus system, having a bus interface for connection to a bus, a serial interface for serially reading out and reading in data, a data memory with an output area for storing data which has been read in via the bus interface and is to be read out via the serial interface and an input area for storing data which has been read in via the serial interface and is to be read out via the bus interface, and a control device for controlling the transmission and storage of data, a detection device to detect the status of the output area and of the input area and providing corresponding status information being provided, which status information is used as the basis for reading data into the output area and reading data out of the input area via the bus interface when the bus system is connected. The present invention also comprises a corresponding active component for exchanging data with such passive component, and a method for reading data in and out of a bus system which comprises such a passive component and such an active component. The present invention makes data communication possible between such a bus system and one or more decentralized peripherals or serial interfaces.

7 Claims, 2 Drawing Sheets

U.S. PATENT DOCUMENTS

| | | | |
|---|---|---|---|
| 6,055,633 A * | 4/2000 | Schrier et al. | 713/100 |
| 6,192,036 B1 * | 2/2001 | Buhler et al. | 370/252 |
| 6,192,281 B1 * | 2/2001 | Brown et al. | 700/2 |
| 6,370,448 B1 * | 4/2002 | Eryurek | 700/282 |
| 6,397,316 B2 * | 5/2002 | Fesas, Jr. | 711/200 |
| 6,421,710 B1 * | 7/2002 | Jasperneite et al. | 709/208 |
| 6,510,449 B1 * | 1/2003 | Yanbe | 709/201 |
| 6,611,557 B1 * | 8/2003 | Kobayashi | 375/225 |

* cited by examiner

SERIAL DATA TRANSMISSION VIA A BUS SYSTEM

CLAIM FOR PRIORITY

This application claims priority to International Application No. PCT/DE00/03109 which was published in the German language on Sep. 7, 2000.

TECHNICAL FIELD OF THE INVENTION

The present invention relates to the transmission of serial data via a bus system, and in particular, to the transmission of serial data via a V.24 interface via a field bus.

BACKGROUND OF THE INVENTION

Bus systems are in use in a wide variety of technical applications. In particular field buses, for example the PROFIBUS (PROcesFieldBUS) according to DIN 19245 (EN 50170 since 1996) are widely used, for example, in automation technology, for the transmission of data over relatively long paths. In contrast to most systems which transmit data in a parallel fashion, the PROFIBUS is a serial bus system in which data is transmitted serially. Field buses have wide-ranging fields of application because they can be connected to, and operated with, both simple and complex components (stations). Furthermore, they are advantageous in terms of the low connection costs and reduced expenditure on cabling. Additional advantages are short reaction times and simple protocols which make field buses real-time-capable. Other factors to note are the high degree of immunity to faults, even over large distances, simple integration in the existence of the systems and the ease with which the respective elements are made independently irreplaceable.

An example of such a field bus is the PROFIBUS according to DIN 19245, which can be divided into various hierarchical layers on the basis of different functionalities and modes of operation. Part 1 of DIN 19245 in this case defines the PROFIBUS layers 1 and 2, where the fieldbus datalink (FDL) is defined, for example. An example of the bus system of these layers is illustrated in FIG. 1. Part 2 of DIN 19245 defines the PROFIBUS layer 7 and contains the fieldbus message specification (FMS). Part 3 of DIN 19245 defines the PROFIBUS DP (decentralized peripherals) which comprises the PROFIBUS FDL of layers 1 and 2 and defines service interfaces and data interfaces for exchanging data with external peripheral data.

A fieldbus such as the PROFIBUS DP usually comprises one or more active stations and a plurality of passive stations. The active and passive stations or components are configured here in a master-slave relationship. This means that the active components actuate the passive components and/or read data in and out. The passive components operate only after being actuated by the active components. The problem with such fieldbuses is the reading out of the current data to external peripherals, such as for example computers. Existing systems are slow, inefficient and complicated.

SUMMARY OF THE INVENTION

The present invention relates to the transmission of serial data via a bus system, and in particular, to the transmission of serial data via a V.24 interface via a field bus, such as the PROFIBUS DP. In particular, the present invention relates to a passive component and an active component for the bus system, at least the passive component having a serial interface for the reading in and reading out of data. Furthermore, the present invention relates to a method for the reading in and reading out of serial data via a bus system.

In one embodiment of the invention, there is a passive component for a bus system, an active component for a bus system and a method for reading data in and out of a bus system which permit rapid, efficient and reliable reading out and reading in of data to or from one or more of the central peripherals.

The system includes, for example, a bus interface for connection to a bus, a serial interface for serially reading out and reading in data, a data memory with an output area to the memory of data which has been read in via the bus interface and is to be read out via the serial interface, and an input area for storing data which has been read in via the serial interface and is to be read out via the bus interface, and a control device for controlling the transmission and storage of data, a detection device to detect the status of the output area and of the input area and providing corresponding status information being provided, which status information is used as the basis for reading data in via the output area and reading data out of the input area via the bus interface when the bus systems are connected.

In one aspect of the invention, there is an active component for exchanging data with such a passive component having, for example, a bus interface for connection to a bus, a data memory with an output area for storing data which is to be stored in the output area of the passive component and is to be read out via its serial interface, and an input area of data which is read out of the input area of the passive component, and a control device for controlling the transmission and storage of data, a detection device to detect the status of the output area and of the input area and for providing corresponding status information being provided, which status information is used by the active component as the basis for reading data from the passive component into the input area via the bus interface and for transmitting data from the output area to the passive component.

In another embodiment of the invention, there is a method for reading serial data into and out of a bus system. The bus system includes, for example, a passive component with a serial interface and a data memory which has an output area for reading out data via the serial interface and an input area, and comprises an active component with a data memory which has an output area and an input area, the statuses of the output areas and of the input areas being detected and corresponding status information being provided, which is used as the basis for the reconciliation of the output area of the active component and the output area of the passive component, and of the input area of the passive component and the input area of the active component.

The passive component according to the present invention advantageously has a comparative device to periodically compare the status information with corresponding status information of the active component, the control device controlling the reading in and reading out of data on the basis of this periodical comparison. For example, in the above-mentioned PROFIBUS DP system, in which the output areas and input areas of the active and passive components are reconciled cyclically, the input areas and output areas of the passive component according to the present invention, and the input areas and output areas of the active component according to the present invention are reconciled, that is to say the data are copied, if the status information indicates that the respective area has the corresponding predefined status which permits or requires the reconciliation of the data. For example, a data packet is not read out of the output area of the active component and into the output area of the passive component until the output area of the passive component is ready to receive this data packet. This means that first the respective data packet has to be read out of the output area of the passive component via the serial interface to a decentralized peripheral before a new data packet can be received. In this context, a buffer for buffering a data packet which is to be read out of the output area via the serial interface can be provided in the passive component in order to enable the output area of the passive component to be made vacant as quickly as possible so that a new data packet from the active component can be read in.

A data packet is furthermore advantageously not read into the input area of the passive component via the serial interface until the corresponding input area of the active component is ready to receive this data packet. In this case, it is possible to provide a buffer which buffers a data packet, to be read into the input area via the serial interface, if the input area of the active component is not yet ready to receive it.

The detection device to detect the status of the output area and of the input area of the passive component advantageously comprise an acknowledgement counter for counting data packets which are read out via the serial interface of the passive component, and a sequence counter for counting data packets which are read in via the serial interface of the passive component, the counting values serving as the status information.

Furthermore, in the passive component according to the present invention, the maximum size of the input area and that of the output area can be set in a variable fashion, the data packets which are to be stored therein being able to have any desired size within the respectively set maximum size. As a result, a very flexible transmission of serial data in the bus system becomes possible.

The passive component described above and in accordance with the present invention is exclusively configured for the reading in and reading out of serial data via a corresponding serial interface, for example a V.24 interface. The active component according to the present invention in this case controls this reading in and reading out of data via the serial interface of the passive component. The data memory of the active component has an output area which is reconciled with the output area of the passive component according to the present invention, and also has an input area which is reconciled with the input area of the passive component according to the present invention. The active component according to the present invention can also have its own serial interface, for example a V.24 interface, for the serial reading of data into the corresponding output area for the serial reading of data out of the corresponding input area. Here, the data packet cannot be read into the output area of the active component via the serial interface until the output area of the passive component is ready to receive this data packet. On the other hand, a data packet which is to be read out via the serial interface of the active component cannot be read from the input area of the passive component into the input area of the active component until the input area of the active component is ready to receive this data packet. Similarly to the passive component, with the active component according to the present invention it is also advantageous if the detection device to detect the status of the output area and of the input area comprise an acknowledgement counter for counting data packets read out via the serial interface, and a sequence counter for counting data packets read in via the serial interface, the target values serving as the status information. In the active element too, the maximum size of the input area and that of the output area can be set in a variable fashion, the data packets to be stored therein being able to have any desired size within the respectively set maximum size. The respective input area and the respective output area can have different sizes here. The size of the input areas and of the output areas are also predefined here for the passive component by the active component.

BRIEF DESCRIPTION OF THE DRAWINGS

The present invention is explained in more detail below by exemplary embodiments and with reference to the appended drawings, in which.

DETAILED DESCRIPTION OF THE PREFERRED EMBODIMENTS

Figure 1:
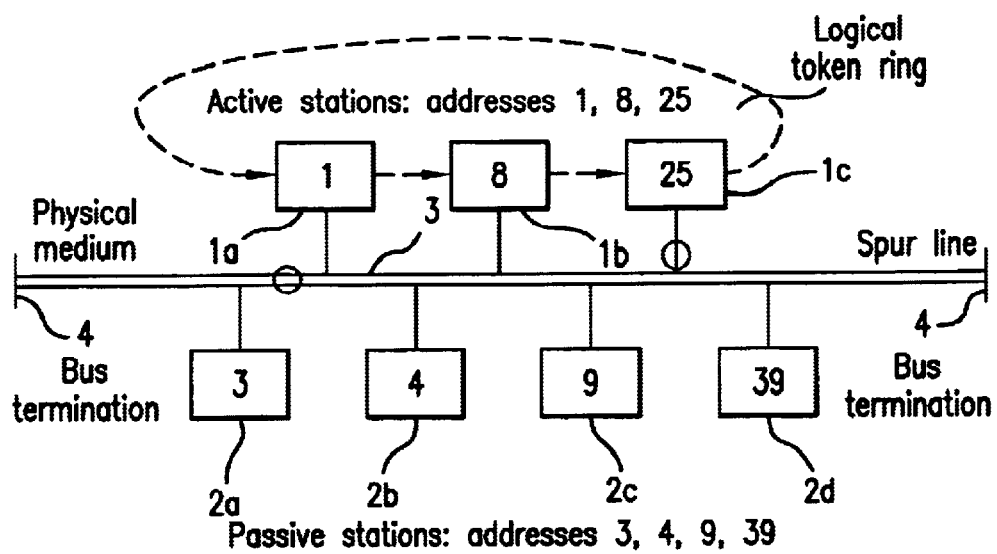
FIG. 1 shows a schematic view of a bus system in the present invention.

The PROFIBUS FDL system (shown in FIG. 1) of the layers 1 and 2 comprises a line-like bus structure in which active components (stations) 1a, 1b and 1c with the addresses 1, 8 and 25 are connected to a bus 4 via spur lines. The bus 4 has a line shape and is terminated at both ends by a bus termination 4. Passive components (stations) 2a, 2b, 2c and 2d with the addresses 3, 4, 9 and 39 are also connected to the bus 4 by spur lines. The address data items are of course examples.

The overall length of the bus 4 can be up to 1.2 km, while the spur lines to the active and passive components are 0.3 m long at maximum. The overall number of subscribers, i.e. the overall number of active and passive components, is restricted to a maximum of 126. The active components 1a, 1b and 1c are connected by a logic token ring, that is to say a decentralized bus access takes place in accordance with the token passing principle. A central bus access is subordinated to this superordinate decentralized passive access in accordance with the master-slave principle. The active components 1a, 1b and 1c are the master stations and form the logic token ring. Each component which has the token can carry out corresponding useful data services. The passive components 2a, 2b, 2c and 2d are slave stations which react to the access by the active components. The active components change data with one another, and the respective active station which is in possession of the token can actuate the other active and passive components. The passive components transmit and receive data only at the request of the active stations and do not participate in the active bus operation.

Each active component and each passive component has an electrical bus interface via which data is exchanged with other components. In the case of the PROFIBUS FDL as well as in the case of the PROFIBUS DP, for example RS 485 interfaces are used which permit data communication with a plurality of other components on the basis of 11 bit/characters (startbit/stop-bit/paritybis, 8 useful data bits).

Figure 2:
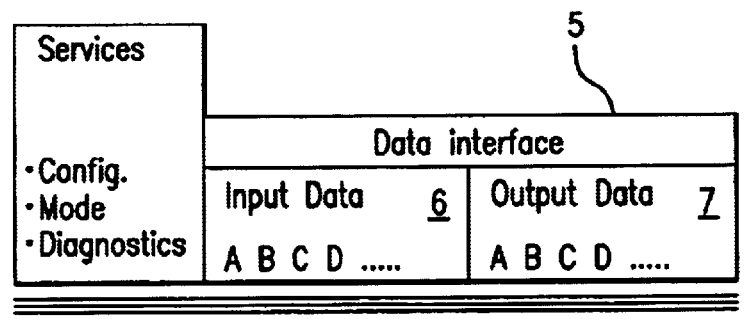
FIG. 2 shows a schematic view of a bus system with higher-value services than the bus system shown in FIG. 1 which forms the basis for the present invention.
Figure 2:
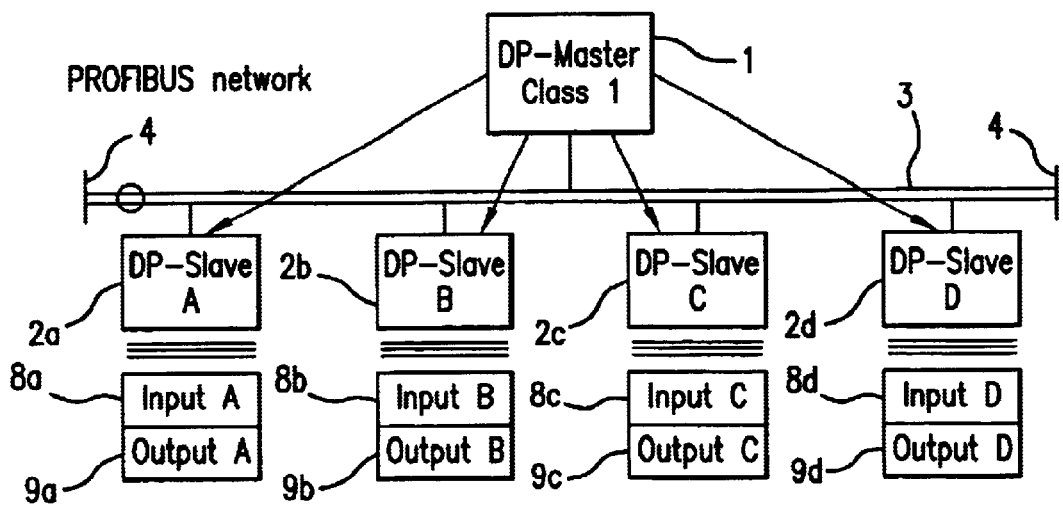

FIG. 2 shows an example of a PROFIBUS DP Monomaster system with an active component 1 (DP Master/Class 1) and a plurality of passive components 2a, 2b, 2c and 2d (DP slaves A, B, C and D) according to the present invention. The PROFIBUS DP comprises services of the PROFI- BUS FDL which are described with respect to the in FIG. 1 and also defines higher-value services, namely service interfaces or data interfaces for communicating with their decentralized peripherals, as shown in FIG. 2. These functionalities of the active component 1 in the PROFIBUS DP system comprise here the data transfer via a data interface 5, via input data areas (input data) 6 and output data areas (output data) 7, and also configuration, stages detection and diagnostics. The passive stations 2a, 2b, 2c and 2d each have an input area (input) and an output area (output). The passive component 2a comprises here an input area 8a and an output area 9a, the passive component 2b comprises an input area 8b and an output area 9b, the passive component 2c comprises an input area 8c and an output area 9c and the passive component 2d comprises an input area 8d and an output area 9d. The passive components 2a, 2b, 2c and 2d are connected to the linear bus 4 via short spur lines, as is the active component 1. A large data memory is provided in the active component 1 and in it the input areas and output areas of the passive components are mirrored, that is to say are present in identical forms. For this purpose, the active component 1 updates its input areas 6 and output areas 7 cyclically with those of the passive components. The output areas 9a, 9b, 9c and 9d of the passive components contain here the data which is to be read out from the passive components to respectively decentralized peripherals, and the input areas 8a, 8b, 8c and 8d contain the data which is to be read from respective decentralized peripherals into the passive components. The input area 6 of the active component 1 contains data to be read out from the active component 1 to a decentralized peripheral, while the output area 7 of the active component 1 contains data which is to be read in from such a decentralized peripheral.

Figure 3:
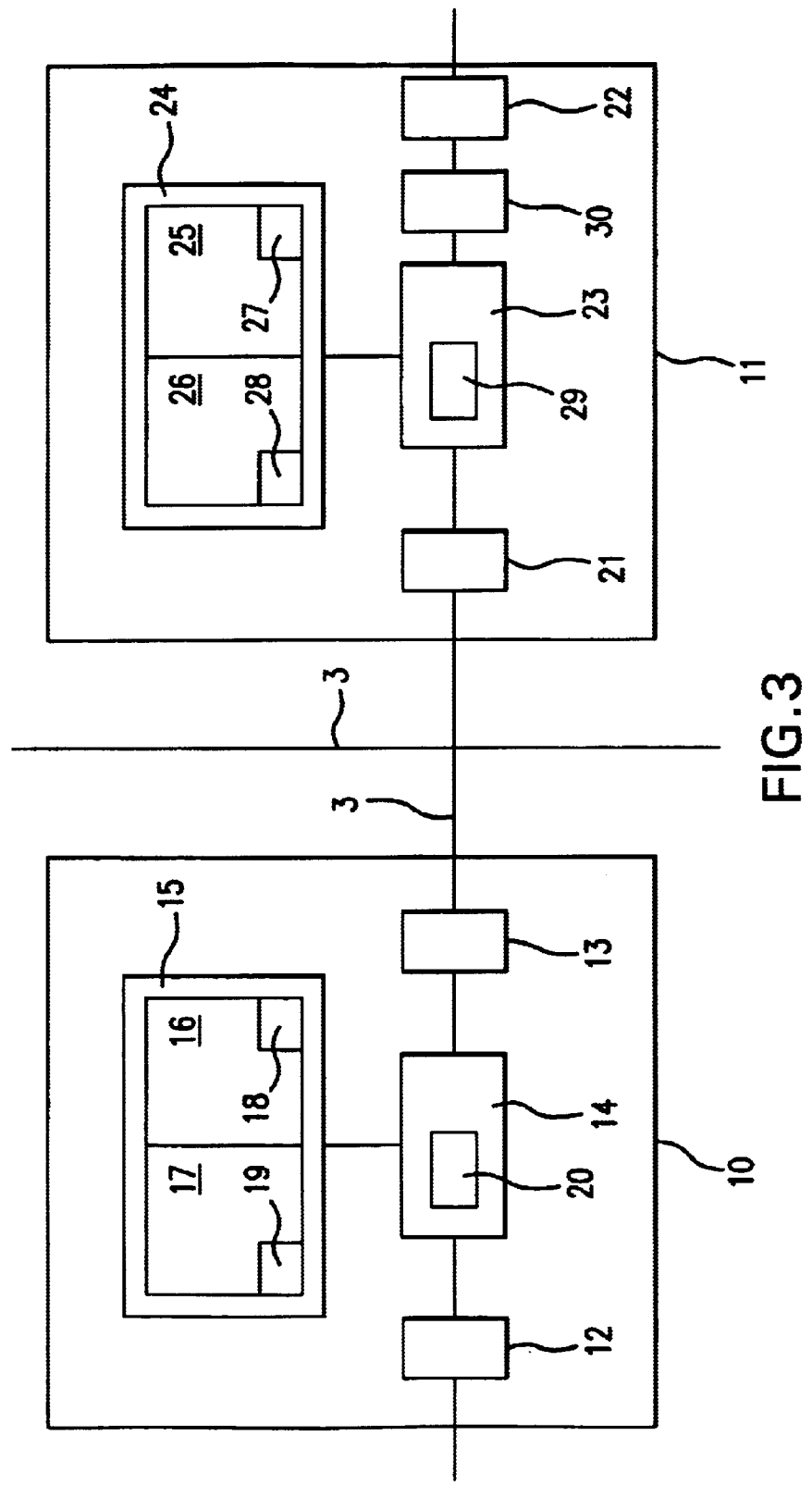
FIG. 3 shows a schematic view of an active component and of a passive component according to the present invention.

FIG. 3 is a schematic illustration of an active component 10 according to the present invention and of a passive component 11 according to the present invention. The active component 10 and the passive component 11 as illustrated in FIG. 3 can be integrated, for example, as an active component 1 or passive component 2a, 2b, 2c or 2d into the bus systems shown in FIGS. 1 and 2.

The passive component 11 which is shown in FIG. 3 comprises a bus interface 21 for connecting the passive component 11 to a bus, such as for example a field bus, as has been described above. Furthermore, the passive component comprises a serial interface 22, for example a V.24 interface for serially reading in and reading out data into and out of a peripheral, such as for example a computer. Furthermore, a data memory 24 with an output area 25 for storing data which has been read out via the bus interface 21 and is to be read in via the serial interface 22, and an input area 26 for storing data which has been read in via the serial interface 22 and is to be read out via the bus interface 21 is provided. The transmission and storage of data is controlled by a control device 23, an acknowledgement counter 27 for counting data packets which are read out via the serial interface 22, and a sequence counter 28 for counting data packets which are read in via the serial interface 22 being provided. The respective counting values serve as the status information with respect to the data packets stored in the output area 25 and input area 26. The acknowledgement counter 27 is embodied as part of the output area 25, while the sequence counter 28 is embodied as part of the input area 26. The data memory 24, which comprises the output area 25 and the input area 26, is, for example, a RAM (Random Access Memory). The control device 23 of the passive component 11 comprises a comparative device 29 to periodically compare the status information with corresponding status information of the active element 10, the control device 23 controlling the reading in and reading out of data via the output area 25 and the input area 26 on the basis of this periodic comparison. An optional buffer 30 for buffering data packets which are to be read out of the output area via the serial interface 22 is provided between the control device 23 and the serial interface 22. The buffer 30 is also used for buffering a data packet which is to be read into the input area 26 via the serial interface 22. The maximum size of the input area 26 and of the output area 25 of the passive component 11 can be set in a variable fashion, the data packets which are to be stored therein being able to have any desired size within the respectively set maximum size, as is explained in detail below.

The passive component 11 which is illustrated in FIG. 3 is connected to a correspondingly assigned active element 10 via its bus interface 21 with a bus system, for example a field bus such as the PROFIBUS DP. The active element 10 correspondingly comprises a bus interface 13 with which it is connected to the bus system. In addition, the active component comprises a data memory 15, for example a RAM, with an output area 16 for storing data which is to be stored in the output area 25 of the passive element 11 and data which is to be read out via its serial interface 22, and an input area 17 of data which has been read out of the input area 26 of the passive component 11. As has been explained above, the data of the output area 16 of the active component 10 and of the output area 25 of the passive component 11 is cyclically mirrored and/or reconciled, like the data of the input area 17 of the active component 10 and the data of the input area 26 of the passive component 11. Here, the data of the output area 16 of the active component 10 is transferred in the output area 25 of the passive component 11, and the data of the input area 26 of the passive component 11 is transferred into the input area 17 of the active component 10. The active component 10 also comprises an optional serial interface 12 for serially reading data into the output area 16 and for serially reading data out of the input area 17. In addition, an acknowledgement counter 19 for counting data packets which have been read out via the serial interface 12, and a sequence counter 19 for counting data packets which have been read out via the serial interface 12 and a sequence counter 18 for counting data packets which have been read in via the serial interface 12 are provided, the counting values serving as the status information, which is used as the basis for the reading of data from the passive component 11 into the input area 17 via the bus interface 13 and for the reading of data out of the output area 18 to the passive component 11. The transmission of data is controlled here by the control device 14 which comprises a comparative device 20 to periodically compare the status information with corresponding status information of the passive component 11, the control device 14 controlling the reading in and reading out of data on the basis of this periodical comparison. The acknowledgement counter 19 is embodied as part of the input area 17, and the sequence counter 18 is embodied as part of the output area 16.

Like the input area 26 and the output area 25 of the passive component 11, the input area 17 and the output area 16 of the active component 10 can also be set with respect to the maximum size, the data packets which are to be stored in them being able to have any desired size within the respectively set maximum size. The maximum size of the input areas 17 and 26 and of the output areas 16 and 25 is set by the active component 10 when the bus system is initialized. For this purpose, the active component 10 sets up the data communication to the passive component 11 in accordance with EN 50 170 and DIN 19 245 when operation is started and transmits a diagnostic message to the passive component 11. The passive component 11, i.e. the control device 23 receives the diagnostic message and signals the corresponding diagnostic parameters back to the active component 10, i.e. its control device 14. The control device 14 of the active component 10 then transmits the parameters to be set to the control device 23 of the passive component 11, as a result of which the latter is parameterized and configured. The setting of the parameters is correspondingly acknowledged by the passive element 11, in response to which the active component 10 transmits a configuration message to the passive component 11. From the configuration message, the passive component 11 detects the data area size for the input area 26 and the output area 25 and sets their sizes correspondingly. The sizes can be defined here in, for example, the limits 7 bytes to 244 bytes. The data area sizes which are set are then acknowledged by the passive component 11. During the further course of the operation, the data is cyclically updated in the input areas 17 and 26 and the output areas 16 and 25. The abovementioned variable setting of the sizes of the output areas and of the input areas is supported in a corresponding way by corresponding algorithms in the control devices 14 and 23.

The passive component 11 according to the present invention is used exclusively for data communication between the bus system and one or more peripherals by means of the serial interface 22 and does not have require any further functions. However, it is also conceivable for the active component 11 according to the present invention to perform additional control or sensor functions in the bus system. The data which is to be read out of the output area 16 of the active component 10 to the output area 25 of the passive component 11 and then via the serial interface 22 of the passive component 11 generally includes data which is used to actuate passive components of the bus system which perform control, sensor and actuator functions and the like. The data which has been read via the serial interface 22 of the passive component into the input area 26 and from there into the input area 17 of the active component 11 includes data which comprises the messages of the corresponding peripheral, connected to the serial interface 22, to the active component 10, these messages being able to be used in turn for actuating other passive components of the bus system, for example.

In the passive component 11 according to the present invention, the data which is used within the bus system is thus converted into output data which is read out via the serial interface 22 to one or more decentralized peripherals, the serial interface 22 being able to be, for example, a V.24 or a RS 232 interface. On the other hand, the passive component 11 according to the present invention of one or more decentralized peripherals into the bus system converts data from serial data into data which has the data format necessary for the bus system.

In order to be able to transmit data between the bus system and one or more decentralized peripherals via the serial interface 22 of the passive component 11 or via the serial interface 12 of the active component 10, according to the present invention a further communications protocol, which is defined for example as in the following tables 1 and 2 is superimposed on the input areas 17 and 25 and the output areas 16 and 24. The serial interfaces 12 and 22 are given in this example as V.24 interfaces.

Table 1 presents the communications protocol for the output areas 16 and 24, that is to say the data transmission device from the active component to the passive component 11 for reading out the data via the serial interface 22 (V.24 interface) of the passive component 11.

| Byte No. | Designation | Function |
| --- | --- | --- |
| o-1 | tx_seq | Sequence counter transmission of a V.24 telegram |
| o-2 | rx_seq_ack | Acknowledgement counter for reception of a V.24 telegram |
| o-3 | Command | Bit 0   0 no significance<br>1 reset of reception buffer DP slave before the new telegram is transmitted<br>Bits 1 . . . 7 reserved |
| o-40 | Reserved | 00 |
| o-5 | rx_pref_len | Preset maximum byte number of a received telegram, if the value 00 is entered here the reception length is independently determined by the DP slave. |
| o-6 | tx_len | Length data [byte] of telegram to be transmitted |
| o-7 | Data 1 | First octet to be transmitted via V.24 |
| o-8 | Data 2 | Second octet to be transmitted via V.24 |
| Data. . . | | . . . |
| o-(txlen + 6) | Data [tx_len] | Last octet to be transmitted via V.24 |

Table 2 represents the communications protocol for the input areas 17 and 26, i.e. the data transmission device from the passive component 11 to the active component 10 for data packets (telegrams) which have been received via the serial interface 22 (V.24 interface) of the passive component 11.

| Byte No. | Designation | Function |
| --- | --- | --- |
| i-1 | tx_seq_ack | Acknowledgement counter for transmit data V.24 |
| i-2 | rx_seq | Sequence counter for reception of a V.24 telegram |
| i-3 | rx_tx_fail | Fault message DP-slave, for format see below. |
| i-4 | Reserved | 00 |
| i-5 | Reserved | 00 |
| i-6 | rx_len | Length data [byte] of the received telegram, the maximum length given in the range o-5 is not exceeded (provided <>0). |
| i-7 | Data 1 | Received data 1 |
| i-8 | Data 2 | Received data 2 |
| : | : | : |
| i-rx len + 6 | Data [rx_len] | Last octet received data |

The reception buffer of the passive component 11 is the buffer 30 for buffering data packets which are to be read in or read out.

The following table 3 represents an example of the display of fault messages of the passive component 11 in the component i-3 of the communications protocol for the input areas.

| Bit position | Significance |
| --- | --- |
| 0 | Reception buffer overflow |
| 1 | Reception error, frame error |
| 2 | parity error |
| 3 | Other reception errors |
| 4 | Reserved (=0) |
| 5 | Reserved (=0) |

-continued

| Bit position | Significance |
| --- | --- |
| 6 | Reserved (=0) |
| 7 | Internal PROFIBUS DP-slave error |

If there is error-free transmission, i.e. error-free reading in of data via the serial interface 22 into the reception memory or buffer (reception buffer) 30 into the input area 26, the byte i-3 is equal to 0. In the case of an error, i.e. if i-3 is unequal to 0, the received data are nevertheless to be read into the input area 26 via the buffer 30 and thus read into the input area 17 of the active component 11 by means of the cyclical reading out via the bus system.

The principle of the transmission mechanism for transmitting data packets data packets to be out of the output area 16 and into the output area 25 and via the serial interface 22 to one or more peripherals will be explained below. The transmission mechanism is based here on a comparison of the bytes o-1 and i-1 of the transmission protocols such as are illustrated, for example, in tables 1 and 2, in the comparator device 20 of the control device 14 of the active component 10 and the comparative device 29 of the control device 23 of the passive component 11. This means that the status or the current counter reading of the sequence counter 18 of the output area 16 and of the acknowledgement counter 27 of the output area 25 are compared. The two counter readings are each contained in byte o-1 and i-1. In principle, a data packet is not read out of the output area 16 of the active component 10 and into the output area 25 of the passive component 11 until the output area 25 is ready to receive this data packet, i.e. the output area 25 is empty. In order to speed up the reading of data packets out of the output area 16 of the active component 10 and into the output area 25 of the passive component 11, the data which is to be read out of the output area 25 via the serial interface 22 is buffered in the buffer 30.

When the data is read out, the control device 14 of the active component 10 firstly checks the bytes o-1 and i-1 for identity. Given identity, data packets which are to be read out can be entered into the output memory 16 of the active component 10 and the data is then, in cyclical reading out, copied into the output area 25 of the passive component 11, from which it is then read out via the serial interface 22. Given nonidentity between the bytes o-1 and i-1, the transmission mechanism is still occupied, i.e. the reading of data out of the output area 25 via the serial interface 22 is not yet terminated so that no new data packets are allowed to be entered into the output area 16 of the active component 10. Given identity between the two bytes, data packets which are to be read out are thus entered into the output area 16 of the active component 10 starting from the byte o-7. The overall length of the data is entered in the byte o-6. The byte o-1 is then incremented by the value +1, as a result of which the bytes o-1 and i-1 are differentiated. As long as this difference exists, no new data is allowed to be entered into the output area 16 of the active component 10.

The passive component 11, i.e. the comparator device 29 of the control device 23 also compares the bytes o-1 and i-1 and, when a difference is detected between these two bytes, it transmits output data from the output area 25 to the serial interface 22 via the buffer 30. When the reading-out operation from the output area 25 is terminated, the byte i-1 is incremented by the value +1, so that the byes i-1 and o-1 again have the same value, with the result that new data packets can be read into the output area 16 of the active component 10.

The reception mechanism for receiving data via the serial interface 22 of the passive component 11 is equivalent. Here, the bytes i-2 and o-2 are each compared in the passive component 11 and in the active component 10. In principle, data packets are not read into the input area 26 of the passive component 11 via the serial interface 22 until the input area 17 of the active component 11 is ready to receive these data packets. The status of the input area 26 is detected via the sequence counter 28, while the status of the input area 17 is detected by the acknowledgement counter 19. The two bytes i-2 and o-2 (cf. tables 1 and 2) each represents the current status or counter reading of the sequence counter 28 or acknowledgement counter 19. When new data packets arrive at the serial interface 22 of the passive component 11, the comparator device 29 of the control device 23 checks the identity of the bytes i-2 and o-2. Given identity, the incoming data packets are allowed to be entered in the input area 26. Given non-identity, the incoming data packets must be buffered in the buffer 30. It is to be noted that the buffer can also be part of the memory 24, in particular if the latter is embodied as a RAM. When incoming data packets are stored in the input area 26, the received data is entered into the input area 26 starting from the byte i-7 (cf. table 2). The overall length of the received data packets is entered in the byte i-6 taking into account the length specification which is preset in the byte o-5. The byte i-2 is then incremented by +1 by the sequence counter 28, as a result of which the byte i-2 and o-2 are different.

The active component 10, i.e. comparator device 20 of the control device 14 detects the difference between the bytes o-2 and i-2 and reads the input data out of the input area 26 into the input area 17. Here, the error status can be obtained from the byte i-3. If the error status is not equal to 0, a serial error was detected when the data packets were received via the serial interface 22. The new data packets which have been read into the input area 17 of the active component 10 are then read out of the input area 17 for further use, for example into other passive components of the bus system in order to actuate them. The release of the input area 17 is shown by the active component 10 in which the acknowledgement counter 19 increments the byte o-2 by the value +1, so that the bytes o-2 and i-2 have the same value again. The identity between i-2 and o-2, which is detected by the comparator device 29 in the passive component 11, indicates to the latter that new data packets can be entered into the input area 26.

The byte o-3 (command byte) shown in table 1 has no significance if it has the value 0. However, if the value 1 is set, the input area 26 of the passive component 11 is cleared in each case before new data packets which are to be read out from the output area 16 of the active component 10 via the serial interface 22. In this case, the control device 23 of the passive component 11 sets the byte i-2, i.e. the sequence counter 28, to the value of the byte o-2, i.e. the value of the sequence counter 18.

Furthermore, it is to be noted that it is not absolutely necessary to provide buffering of the data in the passive component 11 in the buffer 30 when data is read out via the serial interface 22. In this case, the buffering may, however, be useful because from the point of view of a passive component 11, the output area 25 is ready to receive again as quickly as possible so that new data packets can be transmitted from the output area 16 into the output area 25 of the passive component 11 by the active component 10. However, when data is read in via the serial interface 22 of the passive component 11, it is important to buffer the incoming data packets in the buffer 30 so that incoming data can be read in without delay. An overflow of the buffer 30 in this case is indicated in the output byte i-3 (cf. tables 2 and 3).

When the active component 10 fails, a watchdog which is prescribed by the corresponding standard, for example the PROFIBUS standard, must be detected by the passive component 11. Here, the last data packet of the active component 10 which was still completely received is read out of the output area 25 of the passive component 11 via the serial interface 22. When there is a network failure, no further data packets are received via the serial interface 22 of the passive component 11. Any data in the buffer 30 is rejected by the passive component. In the case of a network failure, or after such a failure, the entire input area of the passive component 11 is set to 0. As a result, a data packet which is received via the serial interface 22 and has the length 0 plus error status in the byte i-3=0, which corresponds to a synchronization message, is implicitly transmitted. If the passive component 11 can no longer be addressed via the bus system, owing, for example, to a network fault, the entire output area 16 of the active component 10 is set to 0. As a result, one or more data packets with the length 0 are implicitly transmitted to the passive component, i.e. a synchronous message.

When the passive component 11 is activated by the bus system and when it is integrated into the bus system, synchronization is necessary. Here, all the output data is set to zero by the active component 10 in the output area 16 with the exception of the byte o-3. The byte o-3 is set to 1 and thus indicates that the passive component 11 should reset its input area, i.e. to 0.

This means that the data in the input area 26 of the passive component 11 is cleared.

What is claimed is:

1. A passive component for a bus system, comprising:
   a bus interface to connect to a bus;
   a serial interface to serially read out and read in data;
   a data memory with an output area to store data read in via the bus interface and to be read out via the serial interface;
   an input area to store data read in via the serial interface and to be read out via the bus interface;
   a control device to control the transmission and storage of data;
   a detection device to detect the status of the output area and of the input area and provide corresponding status information, which status information is used as the basis for reading data into the output area and reading data out of the input area via the bus interface when the bus system is connected; and
   a comparative device to periodically compare the status information with corresponding status information of an active component of a connected bus system, the control device controlling the reading in and reading out of data on the basis of the periodic comparison.

2. The passive component as claimed in claim 1, a data packet is not read out of a corresponding output area of the active component and into the output area until the output area is ready to receive the data packet.

3. The passive component as claimed in claim 2, further comprising a buffer to buff a data packet which is to be read out of the output area via the serial interface.

4. The passive component as claimed in claim 2, wherein the data packet is not read into the input area via the serial interface until a corresponding input area of the active component is ready to receive the data packet.

5. The passive component as claimed in claim 4, further comprising a buffer to buffer the data packet, to be read into the input area via the serial interface, if an input area of the active component is not yet ready to receive it.

6. An active component for exchanging data with a passive component, comprising:
   a bus interface to connect a bus;
   a data memory with an output area to store data in the output area of the passive component and to be read out via a serial interface;
   an input area of data which is read out of an input area of the passive component;
   a control device to control the transmission and the storage of data;
   a detection device to detect the status of the output area and of the input area and provide status information, which status information is used by the active component, as the basis for reading data from the passive element into the input area via the bus interface and reading data out of the output area to the passive component; and
   a comparative device to periodically compare the status information with corresponding status information of the passive component, the control device controlling the reading in and reading out of the data on the basis of the periodic comparison.

7. A method for reading serial data into and out of a bus system which comprises a passive component, forming a slave station, with a serial interface and a data memory, which has an output area for reading out data via the serial interface and comprises an input area, and an active component, forming a master station, with a data memory which has an output area and an input area, comprising:
   transferring data at the request of the active component via the passive component;
   detecting the status of the output areas and of the input areas and providing status information corresponding to the status, which status information is used as the basis for the transfer of the data of the output area of the active component into the output area of the passive component, and the transfer of the data of the input area of the passive component into the input area of the active component; and
   comparing the status information of the output areas of the active and passive components and periodically comparing the status information of the input areas of the active and passive components, and reconciliation of the output areas and the input areas carried out on the basis of comparison.

* * * * *